Oct. 31, 1933.  M. S. McKELLAR  1,932,471
RELIEF DEVICE FOR VALVES
Filed April 6, 1931   2 Sheets-Sheet 2

Marion S. McKellar
INVENTOR
BY Jesse R. Stone
ATTORNEY

Patented Oct. 31, 1933

1,932,471

UNITED STATES PATENT OFFICE 1,932,471

RELIEF DEVICE FOR VALVES

Marion S. McKellar, Houston, Tex., assignor to Hughes Tool Company, Houston, Tex., a corporation of Texas Application April 6, 1931. Serial No. 528,085

2 Claims. (Cl. 277—36)

My invention relates to valves, and while it is more particularly adapted for gate valves it may be adapted to other types of valves as may be apparent.

It is an object of the invention to provide a relief means, whereby the pressure upon the valve may be somewhat equalized so as to allow the valve to be opened. It is a common experience with the valves which are employed in lines in which the fluid is under high pressure, that the pressure of the fluid exerted on the valve causes such high friction that it is extremely difficult to remove the valve from its seat.

I contemplate the provision of a relief opening through the valve which may be opened to allow the passage of the pressure fluid before the valve gate is raised from its seat, thereby equalizing the pressure on both sides of the valve to some extent and overcoming the high friction usually encountered.

I further have as an object to control a relief opening by means of connecting with the stem of the valve, so that a strong and positive means may be thus provided to operate my invention.

Referring to the drawings herewith Fig. 1 is a central vertical section through a gate valve equipped with my invention.

Figure 1:
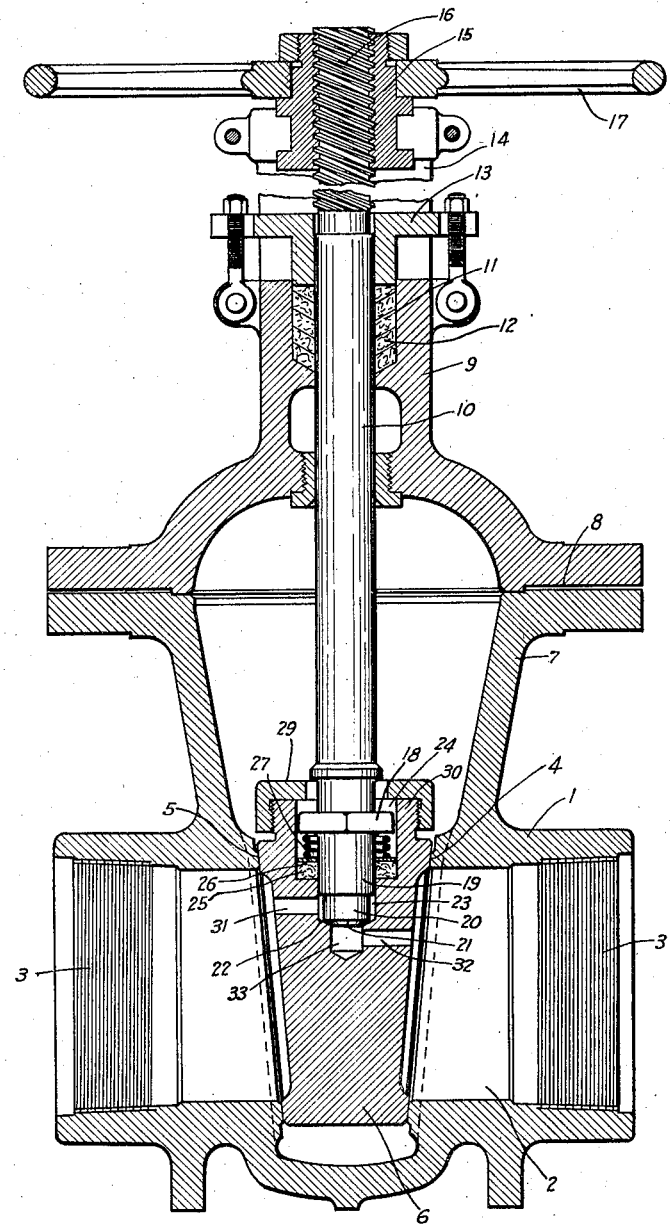

In Fig. 1 I have shown a gate valve of ordinary construction. I have a valve body 1 having a passage 2 therethrough threaded at opposite ends as shown at 3 to connect in a fluid conducting line. Midway of the ends of the body are two opposed downwardly tapered valve seats 4 and 5 into which may be received the wedge shaped valve member 6.

Projecting laterally from the valve body is the bonnet 7 of the usual construction divided transversely at 8 in the usual manner and having a projecting support 9 thereon for the valve stem 10. There is a stuffing box 11 about the valve stem having packing 12 therein adapted to be compressed by a gland 13.

Projecting beyond the gland are two opposite arms 14 within which is swiveled a nut 15, which may be rotated about the threaded end 16 of the valve stem by means of the handle 17. This is of ordinary construction and provides no part of the present invention.

In carrying out my invention I provide a particular construction of the lower end of the valve stem where it connects with the gate valve. Said stem has a radial flange 18 thereon below which is a cylindrical portion 19 reduced in diameter at 20. The lower extremity of the valve stem is beveled at 21 to form a separate valve member, fitting within a tapered seat 22 within the recess 23 in the gate valve.

Said gate valve is provided with a hexagonal upper recess 24 to receive the flange 18 and the packing about the stem. Said packing includes a compressible ring 25 having a washer 26 thereon and a spring 27 compressed between the flange 18 and said washer to hold the packing tightly about the portion 19 of the valve stem. There is a cap 29 screwed around the upper end of the projection 30 upon the gate valve to enclose the packing member.

The recess 23 into which the end of the valve stem projects has an opening 31 leading therethrough to the passage 2 at one side of the valve, and a passage 32 on the opposite side of the valve connects the passage 2 in the valve body with the extension 33 at the lower end of the recess 23.

In the operation of this device, the screwing of the valve stem downwardly to force the valve to closed position will compress the spring 27 and move the valve 21 at the end of the stem into its seat to close passages 31 and 32 through the gate. When the gate valve is closed, the passage through the gate will also be closed. When the valve is to be opened, the screwing of the stem outwardly will first raise the valve member at the end of the stem from its seat and open the passage through the gate. This will relieve the pressure against the gate to some extent, so that when the flange 18 comes in contact with the cap 29, the gate may be moved from its seat with little difficulty.

Figure 2:
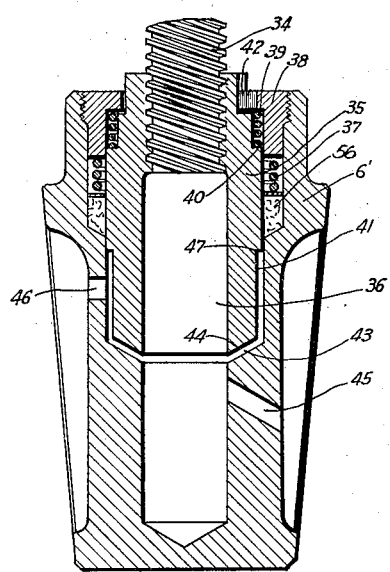
Fig. 2 is a central vertical section through the valve member itself, illustrating a slightly different embodiment of the invention.

In Fig. 2, the construction of the invention is slightly changed so as to adapt it to the non-rising stem type of valve. The threaded lower end 34 of the valve stem is engaged within a threaded opening in a head 35 fitting within a recess in the upper end of the gate 6". The stem is adapted to move the valve outwardly, allowing the valve stem to project through the inner chamber 36 in the gate.

The head 35 upon the valve stem is movable to some extent within the recess in the gate valve, and a fluid seal is maintained about said head by means of a packing 56 held in position by a spring 37 as in the previous embodiment. A gland 38 screwed into the outer end of the recess holds the spring in position and also tends to limit the outward movement of the head 35. There is a spring 39 between a shoulder 40 on the head and an inner flange on the end 38, which ordinarily tends to hold the head downwardly in the recess 41 in the gate. The head 35 is held against rotation relative to the gate by means of a key 42.

The recess 41 has a beveled lower end 43 which forms a seat for the tapered lower end 44 of the head. There are openings 45 and 46 from the interior of the gate to allow passages of fluid from either side thereof.

The head 35 is decreased slightly in diameter at 47 to provide a space around the lower end thereof which allows the passage of fluid when the head 35 is off the seat 43. This construction will operate in practically the same manner as did the previous embodiment.

The rotation of the valve stem 34 to move the valve to closed position will first force the head 35 to its seat to close the connection between the central recess 36 and the opening 46. The gate valve will then be closed. When the gate valve is to be opened, the rotation of the valve stem 34 in the opposite direction will raise the head 35 so as to move it into the position shown in Fig. 2. This will allow the passage of pressure fluid past the gate to equalize the pressure, and the further raising of the head 35 will move the gate with it in an obvious manner.

Figure 3:
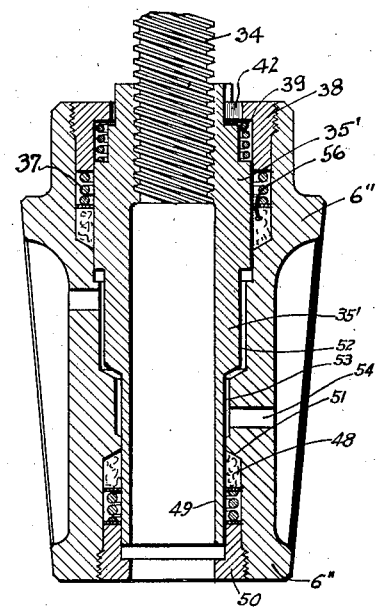
Fig. 3 is a similar central vertical section illustrating a still further embodiment of the invention.

In Fig. 3, the structure shown in Fig. 2 is modified so as to extend the head 35' downwardly nearly through the gate 6". There is a packing member 48 around the extension 49 on the head, and a tubular nut or gland 50 holds the packing within the stuffing box 51 provided for said packing.

The recess 52 about the head within the gate is extended downwardly at 53 to connect with the opening 54 therefrom. The operation of this device will be practically identical with that of the previous embodiment and need not be particularly described.

The advantage of my construction lies particularly in the ease with which the valve can be operated. Without any particular adjustment, the movement of the valve stem will first open the passage through the gate to regulate the pressure on opposite sides thereof, and the further movement of the valve stem in the same direction will move the gate. In the closing of the valve, the added structure will not in any way interfere with the rapid operation thereof.

The advantages will be apparent to those skilled in the art.

What I claim as new is:

1. A gate valve, a stem thereon to move said valve to and from its seat, said stem having a slight longitudinal movement relative to said valve, a vent passage through said gate means to seal the escape of fluid from said vent around said stem, and a projection on said stem adapted to be moved with said stem to positions opening or closing said vent by the relative movement of said stem in said valve to open or close said valve.

2. A valve body having a transverse valve seat therein, a valve shaped to fit said seat, a stem on said valve, means connecting said stem to said valve to allow a slight longitudinal play between said valve and stem, said valve having a vent, means on said stem normally closing said vent when said valve is closed, but responsive to an opening pull on said stem to open said vent and a spring on said stem tending to retain said vent in open position when said valve is raised.

MARION S. McKELLAR.